US005569897A

United States Patent [19]
Masuda

[11] Patent Number: 5,569,897
[45] Date of Patent: Oct. 29, 1996

[54] CREDIT CARD SYSTEM AND METHOD OF ISSUING CREDIT CARD USING SUCH A SYSTEM

[75] Inventor: Hidehiro Masuda, Tokyo, Japan

[73] Assignee: Nippon Shinpan Co., Ltd., Tokyo, Japan

[21] Appl. No.: 375,370

[22] Filed: Jan. 19, 1995

[30] Foreign Application Priority Data

Jan. 26, 1994 [JP] Japan .................................. 6-023491

[51] Int. Cl.⁶ .................................................. G06F 15/30
[52] U.S. Cl. ........................................... 235/379; 235/380
[58] Field of Search .................................... 235/379, 381, 235/380, 492

[56] References Cited

U.S. PATENT DOCUMENTS

| | | | |
|---|---|---|---|
| 4,641,239 | 2/1987 | Takesako | 235/379 |
| 4,802,218 | 1/1989 | Wright et al. | 235/492 |
| 4,841,131 | 6/1989 | Iijima | 235/380 |
| 4,877,947 | 10/1989 | Mori | 235/381 |
| 4,900,903 | 2/1990 | Wright et al. | 235/380 |
| 5,336,870 | 8/1994 | Hughes et al. | 235/379 |

FOREIGN PATENT DOCUMENTS

| | | |
|---|---|---|
| 61-93278 | 6/1986 | Japan . |
| 61-139498 | 6/1986 | Japan . |
| 61-150172 | 9/1986 | Japan . |
| 63-131306 | 6/1988 | Japan . |
| 4-34095 | 2/1992 | Japan . |

*Primary Examiner*—Harold Pitts
*Attorney, Agent, or Firm*—Fish & Richardson P.C.

[57] ABSTRACT

A credit card system includes a card having storage columns for recording first identification information, a generating unit for generating a check code from the first identification information and second identification information, a card reader/writer for reading information from and writing information on the card, a keyboard for entering the second identification information and a check code. A comparing unit compares the check code generated by the generating means with a check code entered by the keyboard or a check code recorded on the card, and a unit for indicating or displaying information representing that the check codes compared by the comparing unit do not agree with each other if the compared check codes do not agree with each other.

10 Claims, 3 Drawing Sheets

CREDIT CARD SYSTEM AND METHOD OF ISSUING CREDIT CARD USING SUCH A SYSTEM

BACKGROUND OF THE INVENTION

1. Field of the Invention

The present invention relates to a system for issuing credit cards to customers for use in selling goods and services (hereinafter collectively referred to as "goods"), and more particularly to a system for checking the validity of credit cards when they are issued and used so as to prevent credit cards from being issued and used illegally.

2. Description of the Related Art

At present, it is very popular for customers to pay for goods with credits. Generally, there are available two types of payment, i.e., payment by installments and payment with a credit card. According to the former payment method, each time a person buys goods at a retail store, he fills out an application form to apply for payment by installments with a credit company or department (hereinafter referred to as a "credit company") through the retail store. After the credit company then checks the credibility of the purchaser, the credit company gives the retail store a membership number indicating that the application has been accepted. The retail store then accepts the payment by installments. This payment method requires that each application for payment by installments be accepted by the credit company. Therefore, the credit company controls every sales contract based on payment by installments, is free of multiple debts and credit collection failures in credit sales, and can entrust retail stores with the preparation of filled-out applications. Purchasers can acquire the goods almost at the same time they apply for payment by installments, and carry back the goods from the retail store. Consequently, this payment method is convenient for customers and retail stores, and effective to promote sales.

According to the payment method using a credit card, the user needs to have a credit card before he buys goods with the credit card. Specifically, the user sends an filled-out application form to a credit company either directly or via a retail store, and the credit company then checks the application. Since no information is available about goods which the user is going to buy and the amount of money which the user is going to pay at the time the credit company issues a credit card, the credit company usually sets a limit amount of money for the user, and issues a credit card with information about the limit amount of money to the user. After having received the credit card, the user can purchase goods with the credit card simply by signing a slip insofar as the amount of money which the user is going to pay for the purchased goods is less than the limit amount of money.

Although the former payment method is convenient, as described above, it requires a complex process which the user and the retail store have to follow because the user has to apply for payment by installments each time he buys goods with credits. For example, when a person buys different goods on different store, he has to apply for payment by installments each time he buys goods on a store.

The latter payment method requires the credit company to carry out an investigation procedure including detailed credibility check. It takes a relatively long period of time before a requested credit card is issued to a customer because of the time and efforts needed to prepare and mail the credit card to the customer. To solve this problem, attempts have been made to issue a credit card immediately on site. However, such an approach also has problems because a certain number of unissued credit cards need to be in stock at the credit card issuing desk, and a person from the credit company, rather than the retail store, is required to directly handle the issuance of credit cards in order to avoid the danger of illegal issuance of credit cards and illegal use of missing credit cards.

As described above, the former payment method is not suitable for repeated use because an application is required each time it is relied upon, but is advantageous in that safety in credit sales is high and retail stores can be entrusted with the preparation of filled-out applications. The latter payment method is suitable for repeated use as no application is required each time it is relied upon, but is disadvantageous in that credit cards cannot immediately be issued when requested by users. The attempted process of immediately issuing credit cards on site will not be widespread because retail stores cannot be entrusted with the issuance of credit cards due to possible illegal issuance and use of credit cards.

SUMMARY OF THE INVENTION

It is therefore an object of the present invention to provide a credit card system capable of issuing credit cards immediately upon request at retail stores, preventing credit cards from being illegally issued and used, and making possible highly safe credit sales.

According to the present invention, there is provided a credit card system comprising a card having storage means for recording first identification information, generating means for generating a check code from the first identification information and second identification information, reading/writing means for reading information from and writing information on the card, entering means for entering the second identification information and a check code, comparing means for comparing the check code generated by the generating means with a check code entered by the entering means or a check code recorded on the card, and means for indicating or displaying information representing that the check codes compared by the comparing means do not agree with each other if the compared check codes do not agree with each other.

According to the present invention, there is also provided a credit card system comprising a card having storage means for recording first identification information, second identification information, and a check code, generating means for generating a check code from the first identification information and the second identification information, reading means for reading information recorded on the card, comparing means for comparing the check code recorded on the card with the check code generated by the generating means, and means for indicating or displaying information representing that the check codes compared by the comparing means do not agree with each other if the compared check codes do not agree with each other.

The card may have a limit amount column for recording a limit amount of money up to which the user of the credit card can pay with the credit card, and the credit card system may further comprise means for updating the limit amount of money recorded in the limit amount column with an amount of money available to the user, and means for comparing the limit amount of money recorded in the limit amount column with an amount of money to be paid by the user, and indicating or displaying the result of comparison.

The card may have an issuance expiration date for recording a date on which the issuance of the credit card expires, and the credit card system may further comprise means for comparing the issuance expiration date with a date on which the credit card is issued, and indicating or displaying the result of comparison.

The card may have a use expiration date for recording a date on which the use of the credit card expires, and the credit card system may further comprise means for comparing the use expiration date with a date on which the credit card is used, and indicating or displaying the result of comparison.

The card may have a password column for recording a password, and the credit card system may further comprise means for comparing the password and a password entered by the entering means.

According to the present invention, there is further provided a method of issuing a credit card with a first system for issuing and managing a credit card, a second system for managing credit information of a customer, and a card having storage means for recording first identification information, the first system having generating means for generating a check code from the first identification information and second identification information, reading/writing means for reading information from and writing information on the card, entering means for entering the second identification information and a check code, comparing means for comparing the check code generated by the generating means with a check code entered by the entering means or a check code recorded on the card, and means for indicating or displaying information representing that the check codes compared by the comparing means do not agree with each other if the compared check codes do not agree with each other, the method comprising the steps of sending the first identification information and an inquiry as to whether a credit card is to be issued, from the first system to the second system, transmitting second identification information of the customer and a check code generated from the first identification information and the second identification information to the first system when the second system determines that the credit card can be issued, generating, in the first system, a check code from the first identification information and the second identification information which is transmitted from the second system, comparing, in the first system, the generated check code with the check code which is transmitted from the second system, and writing information indicating that the credit card can be issued on the credit card and issuing the credit card if the compared check codes agree with each other.

A plurality of cards with storage means which can be issued are stocked in the retail store which has the first system. Each of the cards has first identification information of the card recorded in the storage means. When asked by a customer to buy goods with credits, the retail store assigns a certain card to the customer, and asks, with the first identification information, the second system for the credibility information of the customer, the second system storing information of the customer with respect to purchases of goods with credits. The second system investigates the credibility information of the customer. If the buying of the goods with credits is allowed, the second system transmits second identification information of the customer and a check code which is calculated from the first identification information and the second identification information, to the first system. In the first system, the generating means generates a check code from the first identification information and the second identification information. The comparing means compares the transmitted check code and the generated check code. If the compared check codes agree with each other, then the reading/writing means records third identification information indicating that the card can be issued, allowing the card to be issued. If the compared check codes dot not agree with each other, then the indicating/displaying means indicates or displays information representing that the compared check codes dot not agree with each other, rejecting the issuance of the card.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 1:
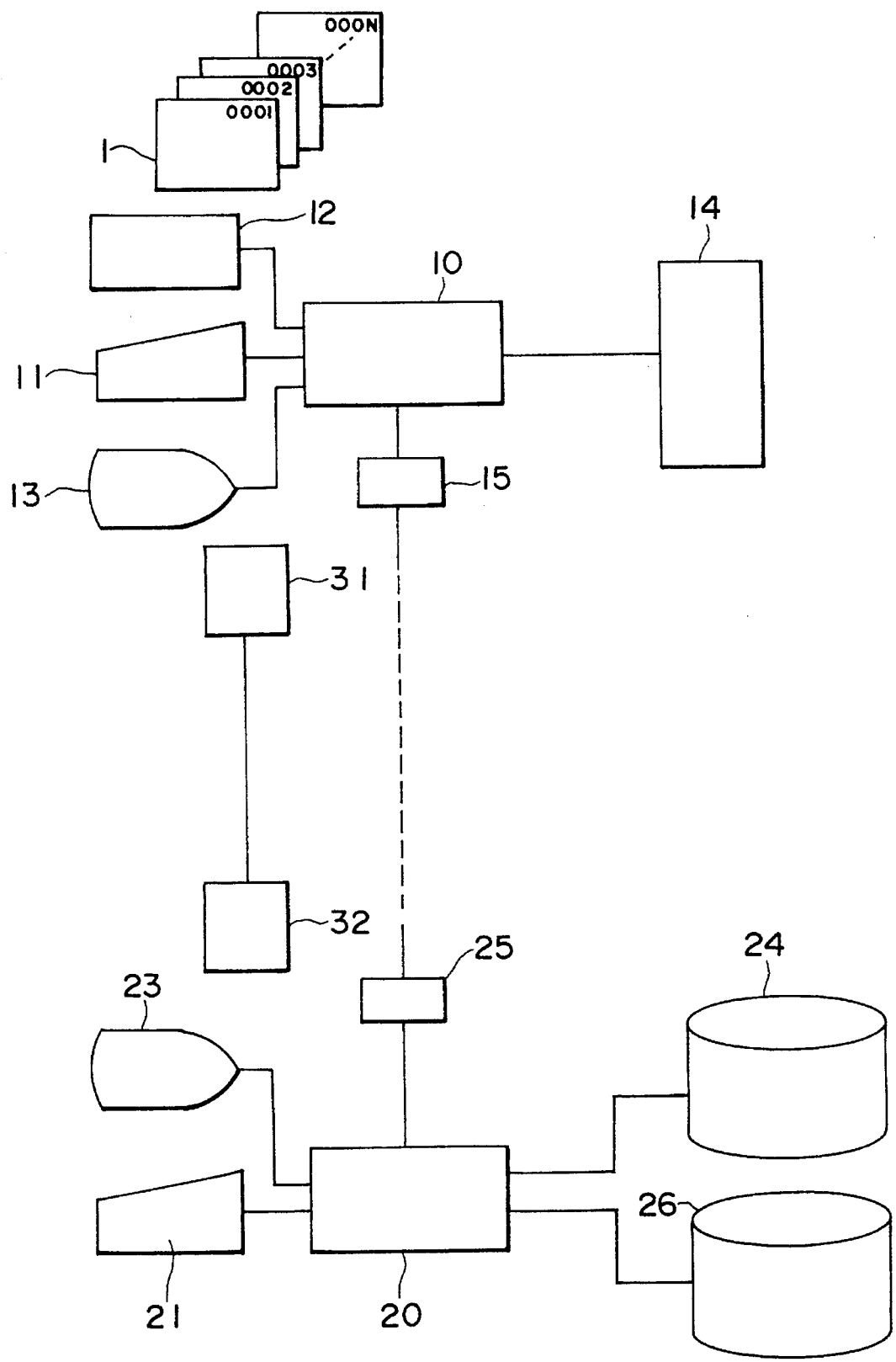
FIG. 1 is a block diagram of a credit card system according to the present invention.
Figure 2:
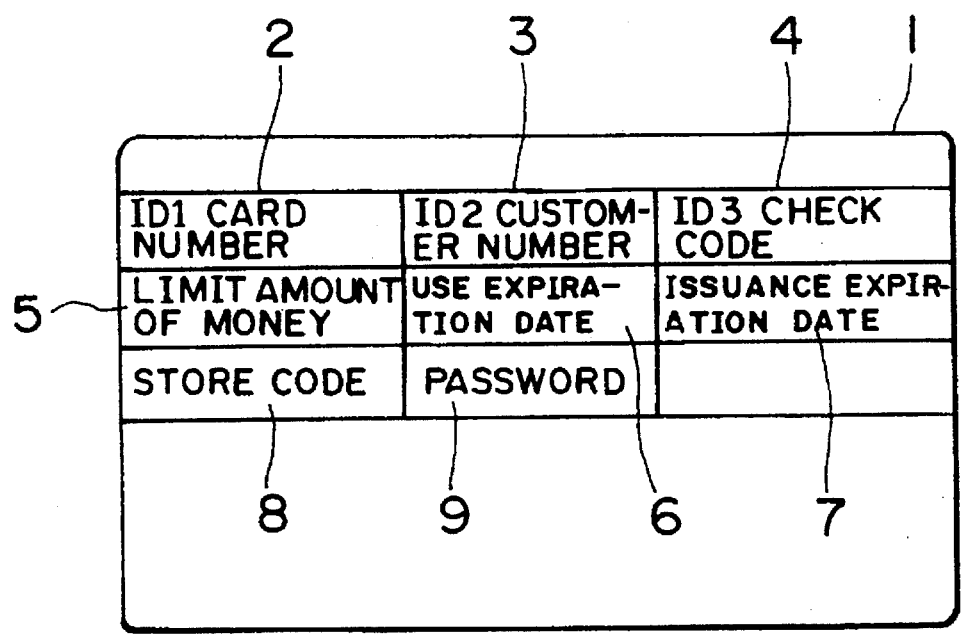
FIG. 2 is a view of a credit card used in the credit card system according to the present invention.

As shown in FIGS. 1 and 2, a credit card system according to the present invention issues credit cards 1 each having a first identification information column 2 for recording an ID1 card number, a second identification information column 3 for recording an ID2 customer number, a check code column 4 for recording an ID3 check code, a limit amount column 5 for recording a limit amount of money up to which the user can pay with the credit card, a use expiration date column 6 for recording an date on which the use of the credit card expires, an issuance expiration date column 7 for recording a date on which the issuance of the credit card expires, a store code column 8 for recording information of a retail store in which the credit card can be used, and a password column 9 for recording a password.

The credit card system shown in FIG. 1 is composed of a first system installed in a retail store for selling goods with credits and a second system installed in a credit company for managing credit information. The credit card system includes a first system processor 10 associated with the first system, a keyboard 11 connected to the first system processor 10, a card reader/writer 12 connected to the first system processor 10, a display unit 13 connected to the first system processor 10, a memory 14 connected to the first system processor 10, a communication adapter connected to the first system processor 10, a second system processor 20 associated with the second system, a keyboard 21 connected to the second system processor 20, a display unit 23 connected to the second system processor 20, a pair of memories 24, 26 connected to the second system processor 20, a communication adapter 25 connected to the second system processor 20, a facsimile device 31 associated with the first system, and a facsimile device 32 associated with the second system.

The credit cards 1 to be issued by the credit card system are stocked in the retail store. Different items of identification information, e.g., numbers from 0001 to 000N, for the respective credit cards 1 are registered in the first identification information columns 2 of the credit cards 1. In the illustrated credit card system, the identification information is incremented from 0001 up to 9999, and returns to 0001 for the 10,000th credit card. The limit amount of money, the use expiration date, the issuance expiration date, and the store code are recorded respectively in the columns 5, 6, 7, 8 of each of the credit cards 1. No information may be recorded in all or some of these columns of a credit card, and information indicative of allowance of the issuance of the credit card may be recorded in these columns at the time the credit card is issued.

When a customer desires the purchase of goods with credits in a retail store, the person in charge in the retail store obtains information about the name, sex, date of birth, etc. of the customer, assigns a credit card 1 with a certain identification number, e.g., 0001, recorded thereon, to the customer, and asks, with the identification number, the second system for the credibility information of the customer. The inquiry may be made on-line through the communication adapters 15, 25 or off-line through the facsimile devices 31, 32. In response to the inquiry, the second system searches files stored in the memories 24, 26 for the credibility of the customer. If the customer has good credibility and the credit sale is allowable, then the second system calculates a check code through certain calculations from the identification number, e.g., N4321, of the customer in a customer information file in the memory 24 and the indicated identification number 0001 of the credit card, and sends the calculated check code and the identification number N4321 to the first system on-line through the communication adapters 15, 25 or off-line through the facsimile devices 31, 32.

Figure 3:
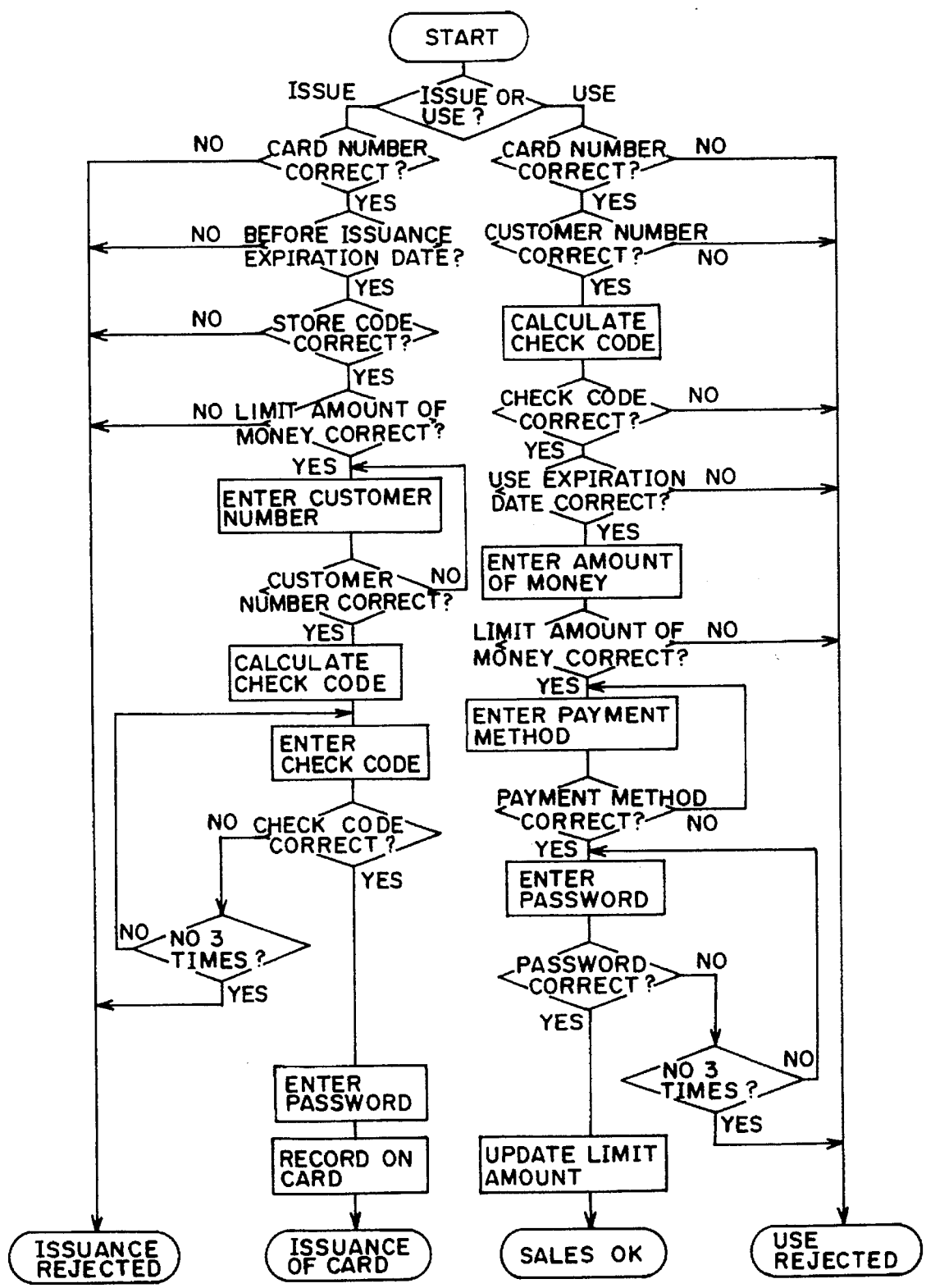
FIG. 3 is a flowchart of a processing sequence of the credit card system according to the present invention.

When the first system is notified of the check code and the identification number N4321, as shown in FIG. 3, the person in charge in the retail store selects new card issuance, and inserts the credit card 1 to be issued into the card reader/ writer 12. The first system processor 10 checks the expiration dates, the limit amount of money, and the store code of the credit card 1, reads the identification number 0001 of the credit card 1, and displays a prompt on the display unit 13 to enter the identification number of the customer. When the person in charge enters the identification number N4321 of the customer through the keyboard 11, the first system processor 10 calculates a check code from the identification number 0001 and the identification number N4321, and displays a prompt on the display unit 13 to enter the check code. When the person in charge enters the check code through the keyboard, the first system processor 10 compares the entered check code with the check code which the first system processor 10 has calculated. If the compared check codes agree with each other, then the first system processor 10 requests the person in charge to enter the password of the customer. When the password is entered, the first system processor 10 records the identification number N4321, the check code, and the password in the columns 3, 4, 9, respectively, of the credit card 1, records the use expiration date in the column 6 of the credit card 1 as information indicative of allowance of the issuance of the credit card 1, and allows the credit card 1 to be issued. If the compared check codes do not agree with each other, then the first system processor 10 determines that the credit card is not a credit card which the first system is intended to issue, and displays information indicative of the rejection of the issuance of the card on the display unit 13. Since the identification number of the card, the identification number of the customer, and the check code calculated therefrom are checked, and the credit card is issued only if these identification numbers and check code are correct. Therefore, credit cards are prevented from being issued illegally. While the person in charge, i.e., the operator of the first system, enters the identification number of the customer and the check code in this embodiment, they can automatically be entered by the first system if the first and second systems are connected on-line to each other. The check codes may be compared with each other after the check code has been recorded on the credit card.

In this embodiment, the credit card is issued with the check code and the identification number of the customer being recorded thereon. However, the credit card may be checked using the check code only when the credit card is issued. In such a case, the step of registering the check code on the card may be dispensed with. If the identification number of the customer is not to be recorded on the credit card for maintaining secrecy or privacy, then the check code may be registered, and the identification number of the customer may be dispensed with. When the identification number of the customer is needed, it can be derived through calculations from the check code on the credit card and the identification number of the card. The limit amount of money up to which the customer can pay with the credit card may be determined for each customer. In such a case, information is recorded in the limit amount column 5 when the credit card is issued. The information indicative of allowance of the issuance of the credit card is not indispensable. The issuance of the credit card may be allowed by recording the limit amount of money, the identification number of the customer, the check code, and other information on the credit card, or recording a simple numerical value such as 1, 0, or the like or a symbol on the credit card.

When the user is to purchase goods with the credit card 1, the user asks the retail store to buy goods with the credit card 1. As shown in FIG. 3, the person in charge in the retail store selects use of the credit card, and inserts the credit card 1 into the card reader/writer 12. The first system processor 10 checks the identification number of the credit card, the identification number of the customer, and the check code in the same manner as described above, and also checks the use expiration date and the store code. The first system processor 10 checks the check code by comparing the check code recorded on the credit card 1 with the check code calculated from the identification number of the credit card 1 and the identification number of the customer. If the compared check codes do not agree with each other, then the first system processor 10 rejects the use of the credit card 1. If the compared check codes agree with each other, then the first system processor 10 displays a prompt on the display unit 13 to enter the amount of money to be paid. When the person in charge enters the amount of money to be paid and a payment method, the first system processor 10 ascertains whether the amount of money to be paid is less than the limit amount of money or not. If not, then the first system processor 10 displays information indicative of rejection of sales with credits on the display unit 13. If the amount of money to be paid is less than the limit amount of money, then the first system processor 10 requests the person in charge to enter the password. If the entered password agrees with the password on the credit card 1, then the first system processor 10 allows sales with credits, subtracts the amount of money to be paid from the limit amount of money, updates the limit amount recorded in the limit amount column 5 with the difference between the amount of money to be paid and the limit amount of money, and returns the credit card 1.

The issued credit card 1 is a credit card with the amount of money (e.g., 300,000 yen) recorded as a limit amount in the limit amount column 5. Insofar as the amount of money to be paid is less than the limit amount money recorded in the limit amount column 5, the customer can use the credit card 1 repeatedly without the need for application for payment with credits and asking for credibility information each time the customer buys goods with the credit card 1. When the limit amount of money is used up, the customer can no longer use the credit card 1. Therefore, the customer is prevented from suffering debts in the excess of the limit amount of money or multiple debts using the same credit card 1. If the limit amount of money is set to a relatively small amount of money, then the credibility investigation carried out by the second system is simplified, allowing the second system to answer to a credibility inquiry from the first system in a very short period of time. Accordingly, a credit card can be issued immediately upon request.

Even though credit cards are issued by the retail store immediately upon request, the credit cards are prevented from being illegally issued with high probability because they are checked based on the information stored in the second system installed in the credit company. When credit cards are used, the credit card system is protected from use of forged credit cards as the credit cards are checked by the plural items of identification information and the check code.

Although a certain preferred embodiment of the present invention has been shown and described in detail, it should be understood that various changes and modifications may be made therein without departing from the scope of the appended claims.

What is claimed is:

1. A credit card system comprising:
   a card having first identification information encoded thereon;
   a card reader configured to read the first identification information from the card;
   an input device configured to supply second identification information and a first check code; and
   a processor connected to the card reader and the input device and configured to generate a second check code based on the first identification information read from the card by the card reader and the second identification information supplied by the input device, to compare the first check code to the second check code, and to indicate whether the first and second check codes are identical.

2. A credit card system comprising:
   a card having first identification information, second identification information, and a first check code generated from the first identification information and second identification information encoded thereon;
   a card reader configured to read the first identification information, the second identification information, and the first check code from the card; and
   a processor connected to the card reader and configured to generate a second check code based on the first identification information and the second identification information, to compare the first check code to the second check code, and to indicate whether the first and second check codes are identical.

3. A credit card system as recited in claim 1 or claim 2, wherein the first identification information comprises a card number.

4. A credit card system as recited in claim 3, wherein the second identification information comprises a customer identification number.

5. A credit card system as recited in claim 1 or claim 2, wherein the card has recorded thereon limit amount information indicative of a maximum amount of money that a user of the card can pay with the card, wherein the card reader is configured to read the limit amount information from the card, and wherein the processor is configured to compare the limit amount information with an amount of money to be paid by the user, the system further comprising a card writer connected to the processor and configured to update the limit amount information.

6. A credit card system as recited in claim 1, wherein the card has recorded thereon an issuance expiration date, wherein the card reader is configured to read the issuance expiration date, and wherein the processor is configured to compare the issuance expiration date with a date on which the card is issued.

7. A credit card system as recited in claim 1 or claim 2, wherein the card has recorded thereon a use expiration date, wherein the card reader is configured to read the use expiration date, and wherein the processor is configured to compare the use expiration date with a date on which the card is used.

8. A credit card system as recited in claim 1 or claim 2, further comprising entry means for permitting a user to enter a first password, wherein the card has recorded thereon a second password, wherein the card reader is configured to read the second password, and wherein the processor is configured to compare the first password to the second password.

9. A method of issuing a credit card comprising:
   sending first identification information stored on a credit card and an inquiry as to whether the credit card is to be issued to a customer from a first system for issuing and managing credit cards to a second system for managing customer credit information;
   at the second system, determining whether a credit card is to be issued to the customer;
   at the second system, generating a first check code based on both the first identification information and second identification information;
   when a credit card is to be issued to the customer, sending the second identification information and the first check code from the second system to the first system;
   at the first system, generating a second check code based on both the first identification information and the second identification information;
   at the first system, comparing the first check code with the second check code; and
   at the first system, issuing the credit card and recording information on the credit card indicative that the credit card has been issued when the first check code is identical to the second check code.

10. The method of claim 9, wherein the information indicative that the credit card has been issued is the second identification information and the first check code.

* * * * *